(12) United States Patent
Stalons

(10) Patent No.: US 9,205,294 B2
(45) Date of Patent: Dec. 8, 2015

(54) SYSTEM FOR TREATMENT AND DISPOSAL OF PHARMACEUTICAL WASTE

(71) Applicant: Donald R. Stalons, Killen, AL (US)

(72) Inventor: Donald R. Stalons, Killen, AL (US)

( * ) Notice: Subject to any disclaimer, the term of this patent is extended or adjusted under 35 U.S.C. 154(b) by 0 days.

(21) Appl. No.: 14/618,714

(22) Filed: Feb. 10, 2015

(65) Prior Publication Data

US 2015/0151152 A1   Jun. 4, 2015

Related U.S. Application Data

(62) Division of application No. 13/525,874, filed on Jun. 18, 2012, now Pat. No. 8,981,175.

(60) Provisional application No. 61/497,609, filed on Jun. 16, 2011.

(51) Int. Cl.
   *B09B 3/00*   (2006.01)
   *A62D 3/36*   (2007.01)
   *B65F 1/14*   (2006.01)

(52) U.S. Cl.
   CPC ............... *A62D 3/36* (2013.01); *B09B 3/0075* (2013.01); *B65F 1/1484* (2013.01); *B65F 1/1615* (2013.01)

(58) Field of Classification Search
   CPC .......................................................... B09B 3/00
   USPC ....................................... 422/184.1; 588/900
   See application file for complete search history.

(56) References Cited

U.S. PATENT DOCUMENTS 8,981,175 B2 *   3/2015   Stalons .................. 588/318

* cited by examiner

*Primary Examiner* — Edward Johnson
(74) *Attorney, Agent, or Firm* — George P. Kobler

(57) ABSTRACT

An exemplary system for treatment and disposal of pharmaceutical waste comprises a sealable pail, a stirring device, a sealable bag, a container, an acidic substance, and a denaturant. The sealable pail receives the pharmaceutical waste and the acidic substance. The acidic substance dissolves the pharmaceutical waste, and the stirring device stirs the acidic substance to ensure that the pharmaceutical waste is completely dissolved. The denaturant is added to the dissolved pharmaceutical waste and renders the dissolved pharmaceutical waste safe for transport. The treated pharmaceutical waste is sealed within the sealable pail, and the sealable bag receives the sealed pail and is sealed. The sealed bag is then placed in the container for transport to a disposal facility.

9 Claims, 4 Drawing Sheets

SYSTEM FOR TREATMENT AND DISPOSAL OF PHARMACEUTICAL WASTE

CROSS REFERENCE TO RELATED APPLICATION

This is a divisional application of co-pending and co-owned U.S. application Ser. No. 13/525,874, filed Jun. 18, 2012, which claims priority to U.S. Provisional Patent App. No. 61/497,609, filed Jun. 16, 2011, both of which are incorporated by reference.

RELATED ART

The disposal of pharmaceutical waste, particularly controlled substances, is problematic due to the numerous laws and regulations governing such disposal. Various federal agencies such as, for example, the Drug Enforcement Administration (DEA), the Department of Justice (DOJ), the Environmental Protection Agency (EPA), and the Department of Transportation, among others, regulate the acquisition, transportation and disposal of pharmaceutical waste. Such regulation is necessary due to the fact that pharmaceutical waste is often classified as a controlled substance. Thus, the numerous federal laws aimed at punishing trafficking of controlled substances, which often carry severe fines and penalties, may be applied to individuals attempting to dispose of pharmaceutical waste.

In order to avoid violating such laws, individuals and companies often dispose of the pharmaceutical waste improperly, such as, for example, by merely flushing it down a toilet or throwing it in the trash. However, such improper disposal of pharmaceutical waste can result in contamination of lakes, rivers and water supplies which can endanger the health of people, wildlife and the environment. Accordingly, systems and methods for treating and disposing of pharmaceutical waste are desired.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to systems and methods for treatment and disposal of pharmaceutical waste. A method for treatment and disposal of pharmaceutical waste according to an exemplary embodiment of the present disclosure comprises the steps of placing pharmaceutical waste in a sealable pail, treating the pharmaceutical waste with an acidic liquid substance, stirring the acidic liquid substance and the pharmaceutical waste with a stirring device, treating the dissolved pharmaceutical waste with a denaturant, sealing the treated pharmaceutical waste within the sealable pail, sealing the sealed pail within a sealable bag, placing the sealed bag in a container, and transporting the container to a disposal facility.

A system for treatment and disposal of pharmaceutical waste according to an exemplary embodiment of the present disclosure comprises a sealable pail, a stirring device, a sealable bag, a container, an acidic substance, and a denaturant. The sealable pail receives the pharmaceutical waste and the acidic substance. The acidic substance dissolves the pharmaceutical waste, and the stirring device stirs the acidic substance to ensure that the pharmaceutical waste is completely dissolved. The denaturant is added to the dissolved pharmaceutical waste and renders the dissolved pharmaceutical waste safe for transport. The treated pharmaceutical waste is sealed within the sealable pail, and the sealable bag receives the sealed pail and is sealed. The sealed bag is then placed in the container for transport to a disposal facility.

Figure 1:
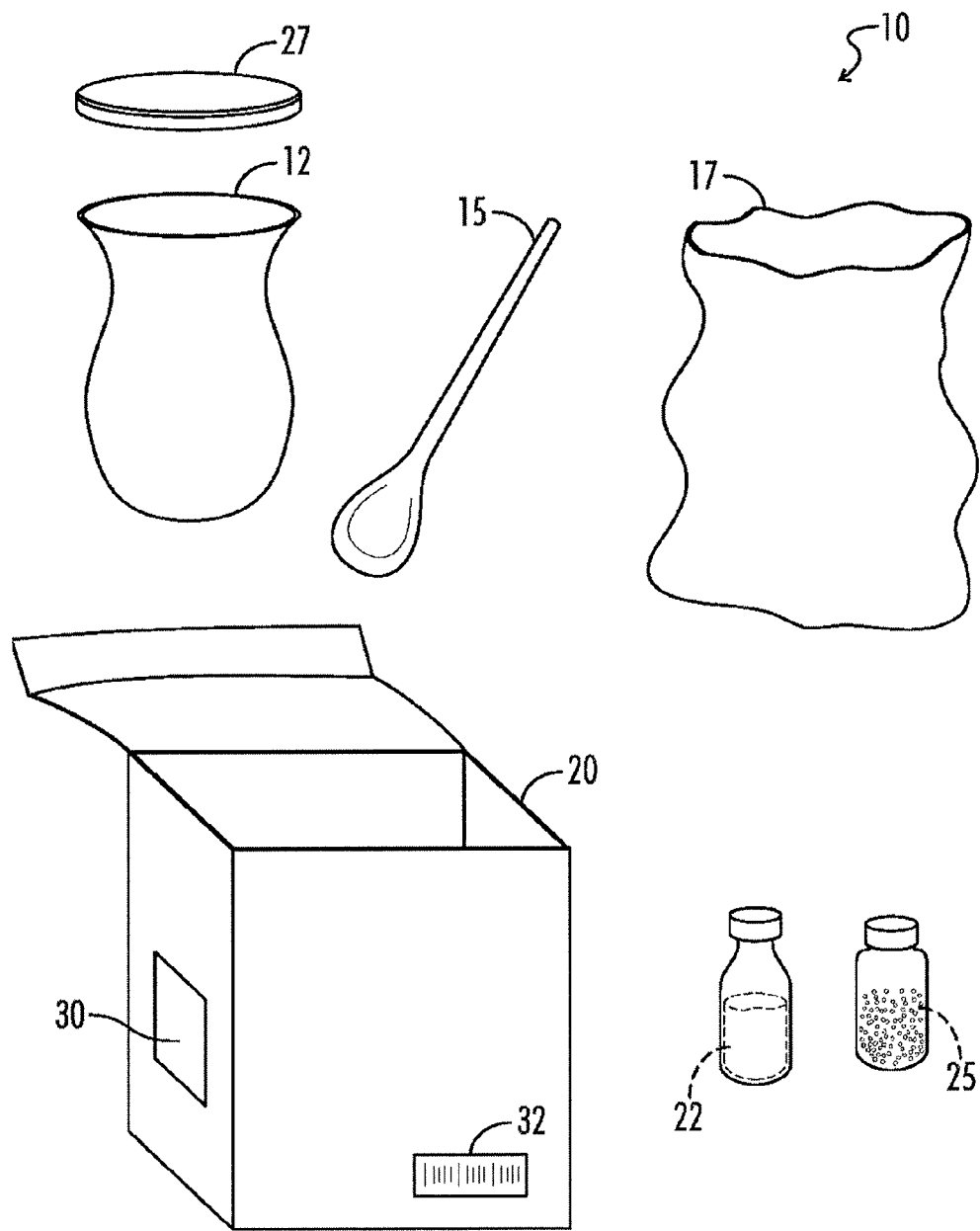
FIG. 1 is a perspective view of a pharmaceutical waste treatment and disposal system according to an exemplary embodiment of the present disclosure.

FIG. 1 is a front perspective view of an exemplary pharmaceutical waste treatment and disposal system 10. In one embodiment, the system 10 comprises a sealable pail 12, a stirring device 15, a sealable bag 17, a container 20, an acidic substance 22, and a denaturant 25. The sealable pail 12 has a lid 27 for sealing the pail 12 in order to prevent contents of the pail 12 from spilling or leaking. In one embodiment, the lid 27 forms a twist-on seal (not shown) with the pail 12, although other types of seals are possible in other embodiments. The sealable pail 12 and the lid 27 comprise rigid material suitable for withstanding contact with the acidic substance 22 and the denaturant 25. In one embodiment, the sealable pail 12 and the lid 27 comprise non-reactive plastic, although other materials, such as, for example, glass, are possible in other embodiments. In one embodiment, the lid 27 comprises a self-locking device in order to ensure that no contents will leak from the pail 12 when the lid 27 is secured on the pail 12. Furthermore, the lid 27 may comprise a tamper evident system (not shown) for verifying that the contents of the pail 12 are not disturbed during transport. The pail 12 may come in one-gallon size and five-gallon size, although other sizes are possible within the scope of the present disclosure.

The sealable pail 12 receives pharmaceutical waste (not shown), such as, for example, prescription pills, capsules, and/or liquids. The sealable pail 12 also receives the acidic substance 22. The acidic substance 22 comprises a chemical formulation designed to dissolve the pharmaceutical waste while maintaining a pH level that is tolerable to human touch, such as, for example, a pH level in the range of approximately 4.0-4.5. In one embodiment, the acidic substance 22 comprises a mineral acid, such as, for example, orthophosphoric acid, although other acidic substances 22 are possible in other embodiments. For example, the acidic substance 22 may comprise hydrochloric acid, acetic acid, nitric acid, sulfuric acid, polyphosphoric acid, boric acid, hydrofluoric acid, hydrobromic acid, or perchloric acid in other embodiments. In one embodiment, the acidic substance 22 comprises liquid, although the substance 22 may comprise a solid in other embodiments. Note that the acidic substance 22 mimics human gastric acidity in order to dissolve the substances comprising the pharmaceutical waste. Thus, in one embodiment, the acidic substance 22 converts at least a portion a portion of the solid pharmaceutical waste, such as, for example, a prescription pill or capsule, into liquid form.

A predetermined amount of the acidic substance 22 should be added to the pharmaceutical waste in order to properly dissolve the waste. Such amount may be dependent on the volume of waste which must be dissolved. For example, in one embodiment, the acidic substance 22 may comprise one part concentrate and nine parts water. Two parts of such acidic substance 22 are then added for every one part of the pharmaceutical waste in the pail 12 in order to fully dissolve the pharmaceutical waste. However, other ratios of concentrate to water and acidic substance 22 to pharmaceutical waste are possible in other embodiments.

The sealable pail 12 also receives the denaturant 25. The denaturant 25 comprises a chemical formulation designed to denature the pharmaceutical waste thereby rendering it inert. In one embodiment, the denaturant 25 comprises a quaternary ammonium cation, such as, for example, denatonium benzoate, although other types of denaturants 25 are possible in other embodiments. For example, the denaturant 25 may comprise denatonium saccharide, isopropanol, methyl ethyl ketone, methyl isobutyl ketone, pyridine, benzene, diethyl phthalate, or naptha in other embodiments. The type of denaturant 25 used may vary depending on the type of pharmaceutical waste being denatured. After the acidic substance 22 completely dissolves the pharmaceutical waste, the denaturant 25 is applied to the dissolved pharmaceutical waste in order to denature the pharmaceutical waste and render the waste safe for transport. In this regard, transporting controlled substances is regulated by federal law, and the denaturant is configured to convert the pharmaceutical waste into a form which is no longer harmful and is no longer classified as a controlled substance such that the treated pharmaceutical waste is safely transported and disposed of in compliance with federal law. In one embodiment, the denaturant 25 is supplied in vials (not shown) having a one-ounce size and a five-ounce size. Thus, the one-ounce size vial of denaturant 25 is used with the one-gallon pail 12 of pharmaceutical waste, and the five-ounce size vial of denaturant 25 is used with the five-gallon pail 12 of pharmaceutical waste. However, the denaturant 25 may come in other sizes and containers in other embodiments.

The stirring device 15 is configured to stir the contents of the pail 12 in order to treat the pharmaceutical waste. For example, the stirring device 15 stirs the acidic substance 22 with the pharmaceutical waste while the substance 22 and the waste are in the pail 12 in order to mix the substance 22 with the waste and completely dissolve the waste. In one embodiment, the stirring device 15 comprises a manual stirring device, such as, for example, a large plastic stirrer. However, in other embodiments, the stirring device 15 may comprise an automatic stirring device having a motor. Other materials, such as, for example, metal, may also be used for the stirring device 15. The stirring device 15 shortens the time required to dissolve the pharmaceutical waste within the acidic substance 22 by exposing unexposed portions of the waste to the substance 22. Furthermore, the stirring device 15 may be used to mix the denaturant 25 with the dissolved pharmaceutical waste. In this regard, the denaturant 25 is added to the dissolved pharmaceutical waste within the pail 12 once the waste is completely dissolved within the acidic substance 22 and has been left to sit for a predetermined amount of time. In one embodiment, a time period of 6 hours is suggested in order to completely dissolve the pharmaceutical waste within the acidic substance 22, although other time periods are possible. For example, a longer time period may be required for soaking time-released prescription pills and/or capsules in the acidic substance 22. Once the denaturant 25 is added to the dissolved pharmaceutical waste, the stirring device 15 may be used to mix the denaturant 25 with the dissolved pharmaceutical waste in order to completely mix the two and ensure that the pharmaceutical waste is denatured and rendered inert thereby rendering it safe for transport. Any particulate which remains after stirring is completed should be removed from the pail 12, crushed, and treated by the acidic substance 22 in a later batch of pharmaceutical waste.

Once the pharmaceutical waste is sufficiently treated and rendered safe for transport, the lid 27 is secured on the pail 12 in order to create a water-tight seal. The sealable bag 17 receives and encloses the sealed pail 12 containing the treated pharmaceutical waste. The sealable bag 17 may comprise plastic or other leak-resistant material in order to prevent any substance which may leak from the pail 12 from leaking from the bag 17. The sealable bag 17 may be sealed with any suitable means for creating a water-tight seal, such as, for example, a clamp, a twist tie, a zip tie or by tying an end of the bag 17. Other means for sealing the bag 17 are possible in other embodiments. While a bag 17 is described herein, any other suitable containment means capable of being sealed are possible in other embodiments. The sealable bag 17 functions as a secondary seal in order to trap any treated pharmaceutical waste which may inadvertently spill or leak from the pail 12. Accordingly, the treated pharmaceutical waste may be transported safely without fear of contamination resulting from spills or leaks.

The container 20 receives the sealed bag 17 containing the sealed pail 12 which contains the treated pharmaceutical waste. The container 20 comprises a material suitable for being shipped and/or transported. In one embodiment, the container 20 comprises a cardboard box. However, the container 20 may comprise other materials, such as, for example, plastic, in other embodiments. Furthermore, the container 20 may have supports (not shown), such as, for example, cardboard or Styrofoam supports, located within the container 20 in order to keep the sealed pail 12 secured within the container 20 during transport. The container 20 may also have at least one pouch 30 located on an outer surface of the container 20 for attaching necessary papers. For example, such papers may indicate the specific contents of the container 20, such as the type of pharmaceutical waste being transported. Furthermore, the container 20 may also have an identifier 32, such as, for example, a barcode, located on an outer surface of the container 20 for tracking the location of the container 20 and verifying disposal/destruction of the pharmaceutical waste in order to ensure compliance with federal laws. Other necessary information may be located on the container 20 in other embodiments.

Figure 2:
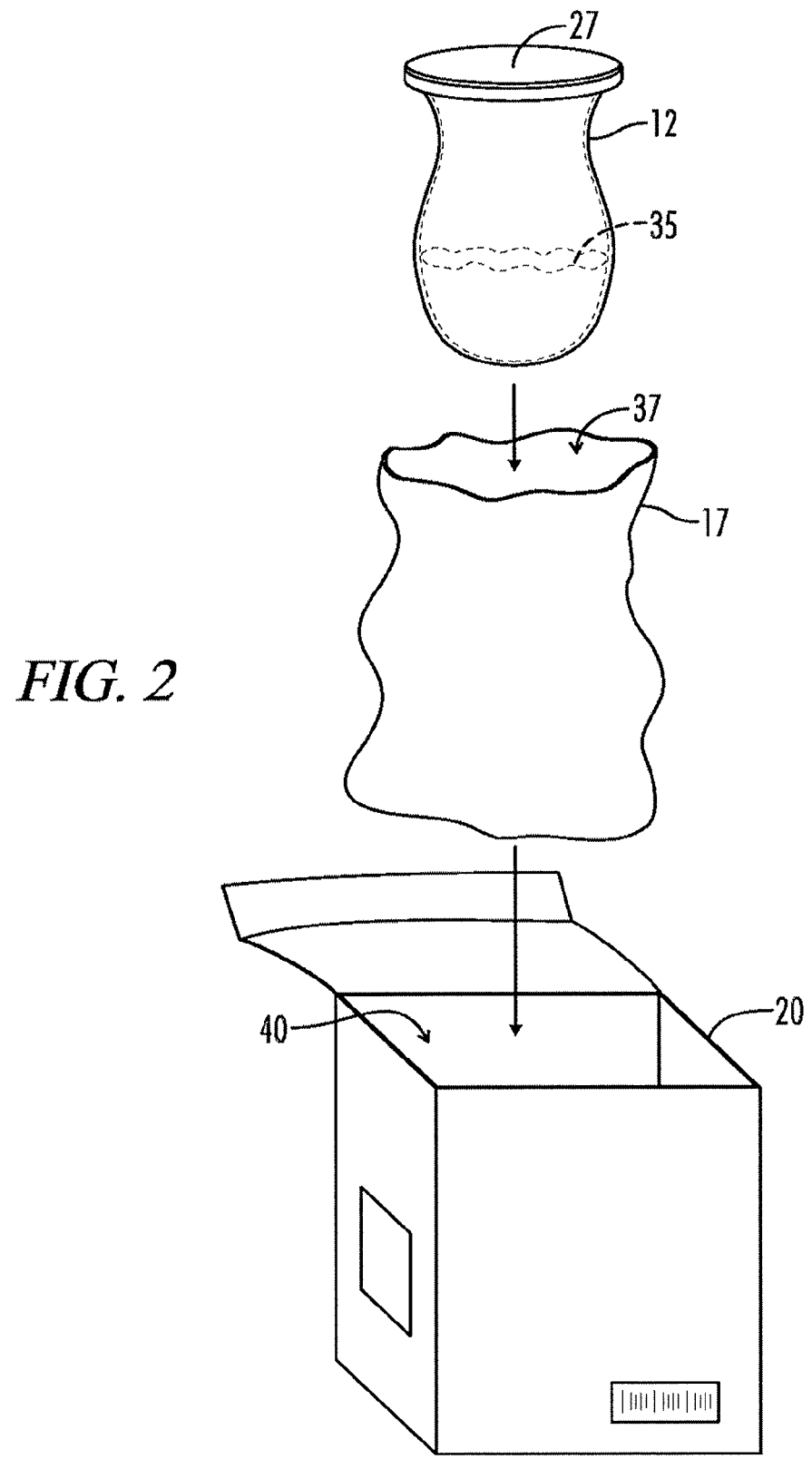
FIG. 2 is a perspective view of the pharmaceutical waste treatment and disposal system of FIG. 1 with treated pharmaceutical waste sealed within the pail.

FIG. 2 is a perspective view of the pharmaceutical waste treatment and disposal system of FIG. 1 with treated pharmaceutical waste 35 sealed within the pail 12. After the pharmaceutical waste 35 has been properly treated with the acidic substance 22 (FIG. 1) and the denaturant 25 (FIG. 1), the lid 27 is secured onto the pail 12 in order to seal the treated pharmaceutical waste 35 within the pail 12. The sealed pail 12 is inserted into an opening 37 of the sealable bag 17. The bag 17 is dimensioned such that the sealed pail 12 will fit completely within the bag 17 with enough room for the opening 37 to be sealed shut thereby sealing the pail 12 within the bag 17. As set forth above, the bag 17 may be sealed by any suitable sealing means. Sealing the sealed pail 12 within the bag 17 provides two leak-resistant layers which contain the treated pharmaceutical waste 35 within the bag 17 in order to prevent contamination of the container 20 or the environment.

The sealed bag 17 containing the sealed pail 12 with the treated pharmaceutical waste 35 is inserted into an opening 40 of the container 20. The container 20 is dimensioned such that the bag 17 containing the sealed pail 12 fits within the opening 40. As set forth above, the container 20 may also have supports (not shown) positioned within the opening 40 in order to stabilize the pail 12 within the container 20 during transport. Once the bag 17 is positioned within the opening 40 of the container 20, the container 20 is shipped and/or transported to the disposal facility (not shown). The treated pharmaceutical waste 35 is rendered safe for transport by the acidic substance 22 and the denaturant 25, and the sealed pail 12 and the sealed bag 17 ensure that the pharmaceutical waste does not spill and contaminate the environment. Accordingly, the pharmaceutical waste treatment and disposal system 10 is provided.

Figure 3:
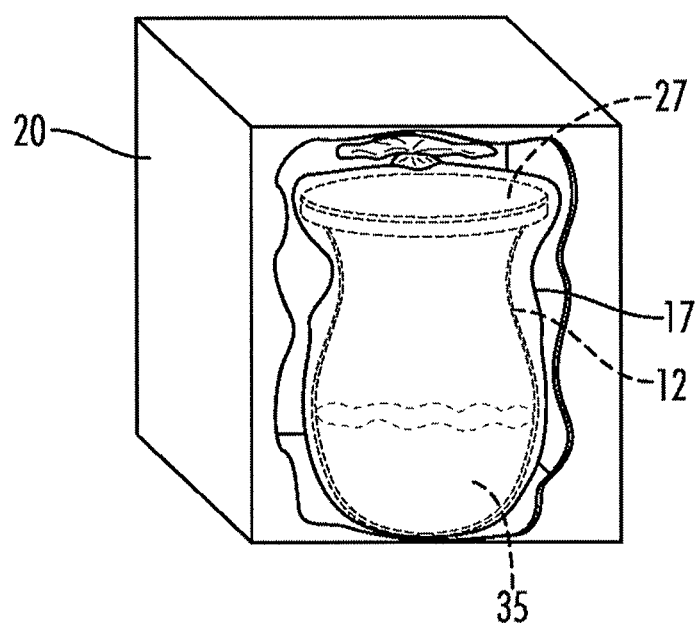
FIG. 3 is a perspective view of the pharmaceutical waste treatment and disposal system of FIG. 1 with the sealed pail positioned within the sealed bag and the container.

FIG. 3 is a perspective view of the pharmaceutical waste treatment and disposal system 10 of FIG. 1 with the sealed pail 12 positioned within the sealed bag 17 and the container 20. As shown by FIG. 3, the treated pharmaceutical waste 35 is sealed within the pail 12 by the lid 27. Furthermore, the sealed bag 17 traps any treated pharmaceutical waste 35 which may spill or leak from the pail 12. An end of the bag 17 depicted in FIG. 3 is tied shut forming a water-tight, leak-resistant seal. However, as set forth above, other means for sealing the bag 17 are possible in other embodiments.

When the bag 17 containing the pail 12 is positioned within the container 20, the container 20 may be shipped or otherwise transported to a disposal facility. Note that the container 20 may be shipped safely while complying with all applicable laws. Furthermore, as set forth above, supports (not shown) may be used to stabilize the pail 12 within the container 20 when the container 20 is shipped in order to prevent the pail 12 from shifting during transport. The container 20 containing the treated pharmaceutical waste 35 is sent to the disposal facility to be destroyed. Accordingly, contamination of lakes, rivers and water supplies by pharmaceutical waste 35 is avoided.

In one exemplary embodiment, assume that the acidic substance 22 comprises one part orthophosphoric acid concentrate and nine parts water. Also assume that the denaturant 25 comprises denatonium benzoate. Furthermore, assume that a one-gallon pail 12 is used and the pharmaceutical waste 35 comprises prescription pills. Finally, assume the container 20 comprises a cardboard box suitable for shipping.

Figure 4:
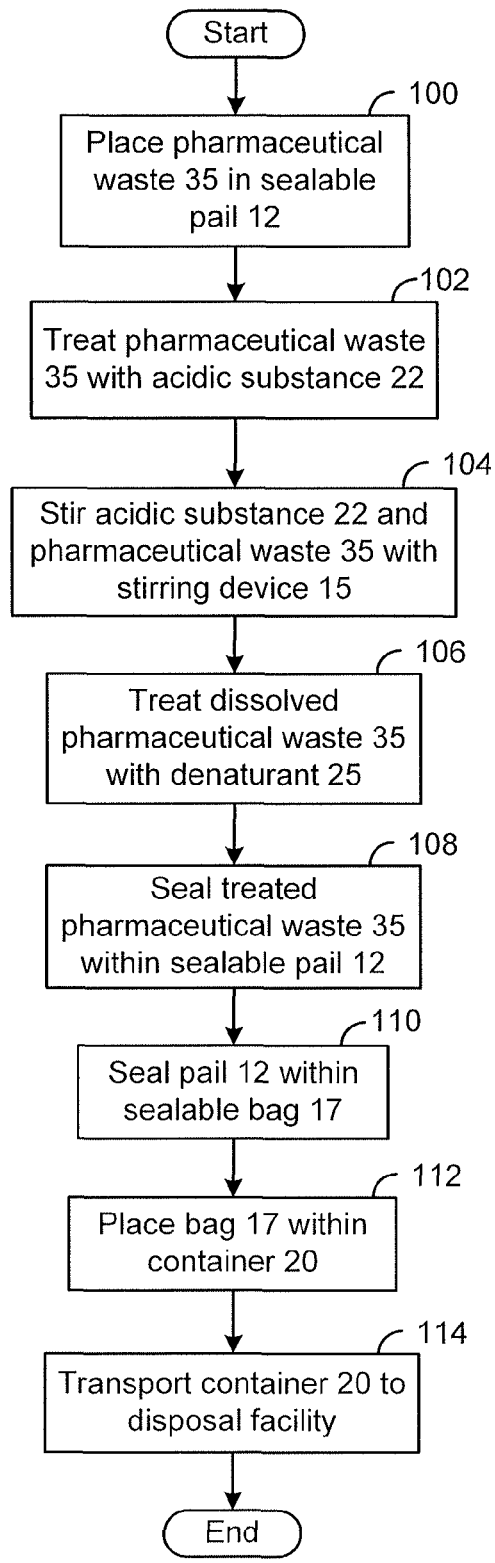
FIG. 4 is a flowchart depicting an exemplary method for treatment and disposal of pharmaceutical waste.

A user places the pharmaceutical waste 35 in the sealable pail 12, as shown by block 100 of FIG. 4. In the present embodiment, such step involves placing a desired number of the prescription pills in the pail 12. However, the number of prescription pills should be limited such that a proper amount of the acidic substance 22 may be added without overflowing the pail 12. Once the pharmaceutical waste 35 is positioned within the pail 12, the acidic substance 22 is then added to the pharmaceutical waste 35, as shown by block 102. In this regard, two parts of the acidic substance 22 are added for every one part of the pharmaceutical waste 35. Such ratio allows enough of the acidic substance 22 to completely dissolve the pharmaceutical waste 35.

After the acidic substance 22 has been added to the pharmaceutical waste 35, the acidic substance 22 and the pharmaceutical waste 35 are stirred with the stirring device 15, as shown by block 104. The pharmaceutical waste 35 must be completely dissolved in order to be rendered safe for transport. Thus, stirring the substance 22 and the waste 35 with the stirring device 15 helps to speed up the process of dissolving the waste 35 by exposing unexposed portions of the waste 35 to the substance 22. After stirring is complete, the pharmaceutical waste 35 may be required to soak in the acidic substance 22 for a specified period of time in order to allow the waste 35 to dissolve completely within the substance 22. In one embodiment, the waste 35 is required to soak in the acidic substance 22 for 6-12 hours, although other time periods are possible. Completely dissolving the pharmaceutical waste 35 in the acidic substance 22 prepares the waste 35 for treatment with the denaturant 25.

Once the pharmaceutical waste 35 is completely dissolved in the acidic substance 22, the pharmaceutical waste 35 is treated with the denaturant 25, as shown by block 106. In this regard, since the pail 12 is a one-gallon pail 12, a one-ounce sized vial of the denaturant 25 is added to the pail 12 in order to treat and denature the pharmaceutical waste 35. The stirring device 15 is again used in order to stir the denaturant 15 with the dissolved pharmaceutical waste 35 and acidic substance 22 and to expose the dissolved waste 35 to the denaturant 25. Such exposure to the denaturant 25 renders the pharmaceutical waste 35 safe for transport since the waste 35 has now been properly treated. Note that the treated pharmaceutical waste 35 may be required to sit for a specified period of time prior to sealing the pail 12 shut in order to ensure that the pharmaceutical waste 35 is sufficiently treated and rendered inert.

Upon sufficiently treating the pharmaceutical waste 35 with the denaturant 25, the treated pharmaceutical waste 35 is sealed within the sealable pail 12, as shown by block 108. In this regard, the lid 27 is secured on the pail 12 such that a water-tight seal is formed around an opening of the pail 12 thereby preventing the treated pharmaceutical waste 35 from escaping the pail 12. The lid 27 may have a self-locking device in order to ensure the lid 27 is secured to the pail 12, and the lid 27 may also have a tamper-evident seal in order to prevent tampering with the treated pharmaceutical waste 35. The sealed pail 12 is then sealed within the sealable bag 17, as shown by block 110. In one embodiment, an end of the sealed bag 17 is tied in a knot in order to close the opening 37 of the bag 17 and to create a water-tight seal. However, as set forth above, other means for sealing the bag 17 are possible in other embodiments.

Once the bag 17 is sealed, the bag 17 is placed in the container 20 for shipping, as shown by block 112. The pail 12 may be supported within the container 20 in order to stabilize the pail 12 during transport and to decrease the likelihood of spills or leaks from the pail 12. After the pail 12 and bag 17 are in a desirable position within the container 20, the container is closed and prepared for shipping and/or transportation to the disposal facility. In this regard, any necessary papers and/or identifiers 32 for tracking the pharmaceutical waste 35 are attached to an outer surface of the container 20. Furthermore, any labels for shipping may also be attached to an outer surface of the container 20.

Once the sealed bag 17 containing the sealed pail 35 containing the treated pharmaceutical waste 35 is positioned within the container 20, the container 20 is transported to the disposal facility, as shown by block 114. In this regard, the pharmaceutical waste 35 has been sufficiently treated such that the pharmaceutical waste 35 is no longer classified as a controlled substance. Thus, the waste 35 is rendered safe and may be transported in compliance with all applicable laws. Furthermore, the waste 35 may be properly disposed of at the disposal facility. Accordingly, contamination by the pharmaceutical waste 35 is avoided, federal laws are complied with, and the pharmaceutical waste 35 is safely and properly destroyed.

Now, therefore, the following is claimed:

1. A pharmaceutical waste treatment system, comprising:
   a sealable pail for receiving pharmaceutical waste;
   an acidic substance configured to dissolve the pharmaceutical waste;
   a denaturant configured to treat the pharmaceutical waste such that the pharmaceutical waste is safe for transport;

a stirring device for agitating the pharmaceutical waste, the acidic substance, and the denaturant within the sealable pail;

a sealable bag dimensioned to receive the sealable pail; and a container dimensioned to receive the sealable bag and the sealable pail.

2. The pharmaceutical waste treatment system of claim 1, wherein the acidic substance is selected from a group including: orthophosphoric acid, hydrochloric acid, acetic acid, nitric acid, sulfuric acid, polyphosphoric acid, boric acid, hydrofluoric acid, hydrobromic acid, and perchloric acid.

3. The pharmaceutical waste treatment system of claim 2, wherein the denaturant is selected from a group including: denatonium benzoate, denatonium saccharide, isopropanol, methyl ethyl ketone, methyl isobutyl ketone, pyridine, benzene, diethyl phthalate, and naptha.

4. The pharmaceutical waste treatment system of claim 1, wherein the sealable pail comprises a lid for forming a watertight seal within the pail.

5. The pharmaceutical waste treatment system of claim 1, wherein the container comprises an identifier located on an outer surface of the container.

6. The pharmaceutical waste treatment system of claim 5, wherein the identifier comprises a barcode.

7. The pharmaceutical waste treatment system of claim 1, wherein the denaturant comprises a quaternary ammonium cation.

8. The pharmaceutical waste treatment system of claim 7, wherein the acidic substance comprises a mineral acid.

9. The pharmaceutical waste treatment system of claim 8, wherein a pH level of the acidic substance is in a range of approximately 4-4.5 pH.

\* \* \* \* \*